United States Patent [19]

Koral et al.

[11] Patent Number: 4,839,808

[45] Date of Patent: Jun. 13, 1989

[54] CORRECTION FOR COMPTON SCATTERING BY ANALYSIS OF ENERGY SPECTRA

[75] Inventors: Kenneth F. Koral; W. Leslie Rogers; Neal H. Clinthorne, all of Ann Arbor, Mich.

[73] Assignee: The University of Michigan, Ann Arbor, Mich.

[21] Appl. No.: 53,242

[22] Filed: May 22, 1987

[51] Int. Cl.[4] .............................................. G01T 1/161
[52] U.S. Cl. .................................. 364/413.24; 378/87
[58] Field of Search ...................... 378/5, 6, 7, 82, 86, 378/87, 901; 364/414, 413.24

[56] References Cited

U.S. PATENT DOCUMENTS 4,029,963 6/1977 Alvarez et al. ......................... 378/5
4,149,081 4/1979 Seppi ..................................... 378/5

FOREIGN PATENT DOCUMENTS 0089785 5/1985 Japan.
0083983 4/1986 Japan.

Primary Examiner—Clark A. Jablon
Attorney, Agent, or Firm—Rohm & Monsanto

[57] ABSTRACT

A system for removing the effects of Compton scattering in systems such as tomographic scanning and radioisotope imaging arrangements, which detect gamma rays, utilizes the smoothness of the Compton component over the image to reduce computing time. Data responsive to energy states of the photons which are detected are received and values corresponding thereto are stored in at least one memory location. In some embodiments, where imaging is the ultimate function of the gamma ray detection system, the data correspond to predetermined image grid points. Also, the data which is stored is processed so as to be separated into a first data set corresponding to unscattered ones of the detected photons and a second data set corresponding to scattered ones of the detected photons. Such processing utilizes least squares fitting analysis, such as the known Golub method. The first data set is summed within specified limits, for determining a number of the unscattered ones of the detected photons. A scatter free image can then be formed from this data set.

13 Claims, 4 Drawing Sheets

CORRECTION FOR COMPTON SCATTERING BY ANALYSIS OF ENERGY SPECTRA

BACKGROUND OF THE INVENTION

This invention relates generally to systems for radioisotope imaging, and more particularly, to a system for improving radioisotope imaging systems by eliminating the effects of Compton scattered gamma rays.

Cameras of the type used in radioisotope imaging are intended to generate an accurate assessment of the distribution of the isotope within an object under investigation. Such imaging is achieved from the outside of the object, in a noninvasive manner. In scintillation camera systems, gamma rays are detected by use of a solid crystal, which typically may be made of sodium iodide or bismuth germanate (BgO). A collimation system and a computation algorithm are employed to establish the correspondence between the location where the gamma ray is detected and the location within the object where the gamma ray originated. Over a period of time, many gamma rays are detected, and the distribution of the isotope within the object can be determined therefrom.

It is well known that gamma rays which are emitted from within an object are subject to interaction with the matter of the object. Such interaction generally takes the form of Compton scattering, which always results in a diminution in the energy of the interacting gamma ray and a change in its direction of travel. Compton scattered gamma rays therefore approach the scintillation camera along a path which differs from that of its origin. If the fact that these gamma rays are Compton scattered is not detected, and therefore they are processed as though they approach the scintillation camera directly from the point of origin, the gamma rays will be assigned incorrectly, and the determined distribution of radioisotope within the object will be incorrect.

One prior art approach to the problem of misassignment of gamma rays involves the detection of the energy content of the gamma rays received. If the gamma ray received at the scintillation camera has lost a relatively large amount of energy, it is presumed that the gamma ray has been subjected to Compton scattering, and is not accepted for further processing. It is a problem with this known approach, however, that the determination of energy content of the gamma rays is not accurately conducted, and therefore a relatively large energy window has to be used so that most of the unscattered gamma rays, or direct gamma rays, will be accepted. Failure to accept for processing a large number of direct gamma rays will result in poor imaging performance. However, the use of a wide energy window results in the acceptance for processing of a significant number of scattered gamma rays, which also results in poor imaging performance.

In one known system for the rejection of scattered gamma rays, the energy window was set symmetrically about the peak of the energy distribution. This peak corresponds generally to the number of gamma rays as a function of their energy. In other systems, the energy window was set asymmetrically about the energy peak. Other known systems obtain energy distributions for different spatial locations on the planar surface of the scintillation camera, and use different energy windows for different spatial locations.

The use of a single energy window does not achieve the desired result of rejecting the gamma rays which have undergone Compton scattering. As the width of the energy window is reduced, or is set asymmetrically toward higher energies, the ratio of scattered gamma rays to direct gamma rays, which are accepted for processing, decreases. However, the total number of direct gamma rays is also reduced. This results in the further problem that statistical fluctuations in the determined radioisotope distribution have greater effect in degrading the imaging performance. Therefore, to avoid unacceptable statistical fluctuations, the energy window must be made sufficiently large, and a significant number of Compton scattered gamma rays are also accepted for processing. The use of energy windows which vary with spatial location reduces the degradation of imaging performance caused by the statistical fluctuations to an extent, but does not eliminate the problem entirely.

A still further known system for rejection of Compton scattered gamma rays utilizes two energy windows. One such window is set symmetrically about the direct peak of the energy distribution, and the other energy window, of equal width, is set adjacent to the symmetrically set energy window, but at lower energies. A fraction of the image of the radioisotope distribution which is reconstructed from the gamma rays accepted within the energy window of reduced energy is subtracted from the image reconstructed from the direct, or unscattered, gamma rays.

It has been learned that the fraction, k, which is used to multiply the image resulting from the lower energy window before subtraction from the upper window is dependent upon the source distribution. The value of the fraction k must be varied in correspondence with the distribution of the radioisotope within the object. Thus, this known technique is difficult to implement because one can determine the proper value of k only if one knows the distribution of the radioisotope within the object, and one can determine the distribution of the radioisotope only if the k value is known.

It is, therefore, an object of this invention to provide a system which improves the imaging performance of radioisotope imaging systems.

It is another object of this invention to provide a system which eliminates Compton scattered gamma rays from inclusion in the processing of a radioisotope distribution image.

It is also an object of this invention to provide a system which rejects gamma rays which have been Compton scattered from final image formation for any distribution of radioisotope.

It is a further object of this invention to provide a system which rejects gamma rays which have been Compton scattered from final image formation using feasible computation techniques.

It is additionally an object of this invention to provide a system which rejects gamma rays which have been Compton scattered from final image formation, and which is suitable for single-photon projection (planar) imaging.

It is yet a further object of this invention to provide a system which rejects gamma rays which have been Compton scattered from final image formation, and which is suitable for single photon emission computed tomography (SPECT).

It is also another object of this invention to provide a system which rejects gamma rays which have been Compton scattered from final image formation, and which is suitable for positron emission computed tomography (PET).

It is yet an additional object of this invention to provide a system which rejects gamma rays which have been Compton scattered from final image formation, and which is suitable for use with radioisotope imaging systems which use sodium iodide (NaI) scintillation crystal material.

It is still another object of this invention to provide a system which rejects gamma rays which have been Compton scattered from final image formation, and which is suitable for use with radioisotope imaging systems which use bismuth germanate (BgO) scintillation crystal material.

It is a yet further object of this invention to provide a system which facilitates quantitatively accurate reconstruction of a radioisotope distribution image.

It is also a further object of this invention to provide a system which rejects gamma rays which have been Compton scattered from final image formation, but which allows for all of the direct gamma rays which are detected to be used for formation of the image.

It is additionally another object of this invention to provide a system which utilizes in the formation of a radioisotope image additional information obtained from a scatter-free calibration step.

A still further object of this invention is to provide a system for eliminating Compton scattered gamma rays which can be applied to any number of tomographically reconstructed planes through the body.

An additional object of this invention is to provide a system for eliminating Compton scattered gamma rays while reducing computation time.

SUMMARY OF THE INVENTION

The foregoing and other objects are achieved by this invention which provides, in a first method aspect thereof, a method of reducing the effects of photons which are subjected to Compton scattering in a gamma ray detection system. In accordance with this aspect of the invention, data responsive to energy states of the photons which are detected are received and values corresponding thereto are stored in at least one memory location. In some embodiments, where imaging is the ultimate function of the gamma ray detection system, the data correspond to predetermined image grid points. In accordance with the invention, the data which is stored is processed so as to be separated into a first data set corresponding to unscattered ones of the detected photons and a second data set corresponding to scattered ones of the detected photons. The first data set is summed within specified limits, for determining a number of the unscattered ones of the detected photons. Subsequently, an image is formed utilizing the number of the unscattered ones of the detected photons.

In a specific, illustrative embodiment of the present method invention, there is performed prior to performing the step of processing, the further step of calibrating the gamma ray detection arrangement. This preferably is achieved by acquiring, in a substantially scatter free manner, a spectral shape corresponding to a calibration function which is expected to correspond to said first data set. The calibration function, in this embodiment, is multiplied by a value corresponding to a peak of the stored data prior to said step of performing a least squares fit. The step of processing includes the further step of performing a least squares fit between the stored data and the calibration function, which itself includes the further step of matrix decomposition.

In a further embodiment of the invention, a coarse imaging grid is formed which has fewer imaging points than the finer imaging grid which comprises the various points for which the data is initially received and stored. The imaging points on the coarser grid may, but need not, correspond to imaging points on the finer grid. However, such a coarser grid, with fewer such imaging points, takes advantage of the fact that the Compton scattering component is smooth and continuous over the image surface, and therefore, since processing is required to be performed at fewer points, net processing throughput is increased. Also, the fact that a patient spends less time being imaged reduces the risk of losing the image as a result of movement of the patient.

After performing the step of processing, illustratively on the relatively fewer imaging points, or pixels, which constitute the coarser grid, there is provided the further step of interpolating between at least selected ones of the points corresponding to the coarse grid to produce a greater number of points. This greater number of points corresponds to the points on the fine imaging grid.

The shape of the Compton scattering spectrum is assumed to be given by:

$$c_i = a_0 + a_1 i + a_2 i^2 + a_3 i^3 \qquad \text{Eq. 1}$$

where $c_i$ is the number of counts in an energy bin, i is the number of the bin, and $a_0$, $a_1$, $a_2$, and $a_3$ are parameters to be determined from the fitting. The nonscattered spectrum, $d_i$, is assumed given in terms of the spectrum for the scatter-free source, $f_i$:

$$d_i = b f_i \qquad \text{Eq. 2}$$

where b is another parameter to be found from the fitting. Then the total spectrum, $\bar{y}_i$, is the sum of the scattered and unscattered components:

$$\bar{y}_i = c_i + d_i \qquad \text{Eq. 3}$$

If the experimental spectrum is $y_i$, the parameters are found by getting the best fit between $\bar{y}_i$ and $y_i$.

After the parameters are set, the Compton scattering spectrum is given by Eq. 1.

In the practice of the present invention, least squares fitting can be achieved as follows:

Let the experimental to be fit be represented by $y_i$, where i is an integer corresponding to a bin number. A bin corresponds to a range of photon energy values, and can be considered to be an energy window. By these assumptions, the fit result $\bar{y}_i$ is the sum of scattered and unscattered components:

$$\bar{y}_i = c_i + d_i$$

Now, let the channel numbers of interest for the fitting run from $i = n_1$ to $i = n_2$, and define some vectors:

$$\bar{Y} = \begin{vmatrix} \bar{Y}_{n_1} \\ \bar{Y}_{n_1+1} \\ \cdot \\ \cdot \\ \cdot \\ \bar{Y}_{n_2} \end{vmatrix} \quad Y = \begin{vmatrix} Y_{n_1} \\ Y_{n_1+1} \\ \cdot \\ \cdot \\ \cdot \\ Y_{n_2} \end{vmatrix} \quad X = \begin{vmatrix} a_0 \\ a_1 \\ \cdot \\ \cdot \\ a_3 \\ b \end{vmatrix}$$

The first two vectors have dimension M, where $M = n_2 - n_1 + 1$, and the third vector has dimension 5.

The least squares problem is to minimize R with respect to parameters $a_0$, $a_1$, $a_2$, $a_3$, and b, where $$R = \|Y - \bar{Y}\|$$

and $\|\cdot\|$ denotes the 2-norm of a vector, i.e., the square root of the sum of the squares of its components.

From Eq. 1, Eq. 2, and the above-defined vectors, including the use of the bin range, one can write:

$$\bar{Y} = \underline{B}X = \begin{vmatrix} 1 & n_1 & n_1^2 & n_1^3 & f_{n_1} \\ 1 & n_1+1 & (n_1+1)^2 & (n_1+1)^3 & f_{n_1+1} \\ \cdot & \cdot & \cdot & \cdot & \cdot \\ \cdot & \cdot & \cdot & \cdot & \cdot \\ \cdot & \cdot & \cdot & \cdot & \cdot \\ 1 & n_2 & n_2^2 & n_2^3 & f_{n_2} \end{vmatrix} \begin{vmatrix} a_0 \\ a_1 \\ \cdot \\ \cdot \\ a_3 \\ b \end{vmatrix}$$

where B is an $M \times 5$ matrix.

In terms of B, R is given by:

$$R = \|\underline{B}X - Y\|$$

A standard technique for solving a linear least squares problem is by first forming the normal equations, and then solving them by a method such as Gaussian elimination. However, these normal equations are often extremely ill-conditioned. There is therefore needed a procedure which is numerically more stable. An example of such a procedure is known as the method of Golub, which has been described in an article entitled, "Numerical methods for Solving Linear Least Squares Problems," by G. Golub, *Numerische Mathematik*, No. 7, pp. 206-216, 1965. This known method uses a matrix decomposition based on orthogonal Householder transformation.

In accordance with a further method aspect of the invention, a method is provided for reducing the effects of Compton scattered photons detected in a gamma ray detection arrangement. Data responsive to the energy states of the detected photons is received and storing said data in memory locations corresponding to a predetermined number of image grid points. Such data is then grouped to produce a coarser imaging grid having fewer image grid points. The data corresponding to the image grid points on the coarser grid is processed so as to separate the stored data into a first data set corresponding to unscattered ones of the detected photons and a second data set corresponding to scattered ones of the detected photons. The second data set is summed for each of the predetermined grid points on the coarser grid for determining the number of the scattered ones of the detected photons. For each of the grid points on the coarser grid, the second data set is interpolated to produce a data set corresponding to the scattering ones of the detected photons for each of the original predetermined number of grid points. The data set which corresponds to the scattered ones of the detected photons for each of the predetermined number of grid points is subtracted from the data stored corresponding to the detected photons, to produce at each of the predetermined number of grid points a data set corresponding to unscattered ones of the detected photons. An image utilizing the unscattered ones of the detected photons is then produced.

In some embodiments, prior to performing the step of processing there is provided the further step of calibrating the gamma ray detection arrangement by acquiring an image shape corresponding to a calibration function which is expected to correspond to the first data set. Additionally, the step of processing may include the further step of performing a least squares fit between the stored data and the calibration function, and may additionally include matrix decomposition, as described hereinabove.

In still further embodiments, the first data set for each of the predetermined grid points on the coarser grid is summed for determining a number of the unscattered ones of the detected photons. Thus, the step of interpolating is performed from the first data set for each of the predetermined grid points on the coarser grid for producing a data set corresponding to the unscattered ones of the detected photons for each of the predetermined number of grid points. In this embodiment, the step of forming an image utilizing the number of the unscattered ones of said detected photons can be performed without the subtraction step.

In accordance with an apparatus aspect of the invention, an arrangement is provided for storing a plurality of values corresponding to a respectively associated plurality of detected photons in a gamma ray detection system. The arrangement is provided with a memory for storing the values; a position input for receiving position input signals corresponding to the spatial position of an associated photon detector, the spatial position being defined by the input signals in x and y dimensions; an energy input for receiving an energy signal corresponding to the energy content of the detected photons; and a first switch having first and second states, whereby when the first switch is in its first state, an output of the arrangement produces x and y position signals corresponding to memory addresses in the memory responsive to the position input signals, and when the first switch is in its second state, the output of the arrangement produces spectral signals wherein the energy signal is correlated to the x dimension.

In a specific embodiment of the invention, the arrangement is provided with a second switch for enabling production of a strobe signal for enabling the memory, the strobe signal being responsive to the y dimension signal when the first switch is in its second state. In some embodiments, the second switching is a linear gate which, when enabled, permits propagation therethrough of analog signals.

The invention may further be provided with an analyzer having an input for receiving the y dimension signal in response to the second switch, and an output for producing the strobe signal. Also, a third switch is provided in certain embodiments for selecting between acquisition of selected data in image mode or in spectral mode.

BRIEF DESCRIPTION OF THE DRAWING

Comprehension of the invention is facilitated by reading the following detailed description in conjunction with the annexed drawing, in which.

DETAILED DESCRIPTION

The present invention is based on the hypothesis that complete energy spectra at individual spatial locations in each view can be analyzed to separate the Compton scattering component from the unscattered component. This hypothesis is tested by reconstructing tomograms from Compton-corrected projection images. In the following experiments, a measurement system of spatial resolution for a GE 400AT camera with a low energy, general purpose collimator was used in simulating projection data. A thin capillary tube was filled with $^{99m}T_c$ and imaged at measurement distances in front of the collimator ranging from 0 to 30 cm. A single 20% energy window was employed.

Resultant images were analyzed by drawing a wide profile perpendicular to the long axis of the capillary tube. The profiles were fit by a symmetric Gaussian function using the method of least squares. The calculated full width at half maximum (FWHM) of the Gaussian was plotted versus depth. A straight line was fitted to these data, also using least squares.

Generation and Reconstruction of Simulated Data

In order to have ideal results to compare to experimental reconstructions, projection data were simulated for a non-radioactive (cold) sphere centrally located within a uniformly radioactive (hot) cylinder. The center of the sphere is assumed to be on the axis of rotation 13.3 cm in front of the collimator, matching experimental conditions. For a slice through the center of the cold sphere, a circle having a 6 cm diameter within a circle having a 21.5 cm was constructed on a fine grid within the computer. All elements at a given distance were then projected onto the camera ignoring attenuation and Compton scattering. To simulate system resolution, this partial projection was then convoluted using a discretized Gaussian of the FWHM appropriate to the depth. The result was added to a total-projection array. After handling all the distances that had pixels containing activity, the projection image was complete.

Since the object is symmetric and we are interested in a noise-free result, this image can be replicated 32 times to form the image-projection set. Reconstruction is then carried out with a standard, filtered-back projection program, such as is available on the Medical Data Systems (MDS) A² computer, with no attenuation correction. A medium resolution filter was selected. By reconstructing with bias on, and again with bias off, one can see the negative values that are present in the reconstructed images and their profiles. One can also fix the true zero in profiles which contain negative values.

Measurement of Experimental Data

The isotope employed was $^{99m}T_c$, and the camera-collimator system was as previously mentioned. Acquisition mode was 64 by 64 word.

Figure 1:
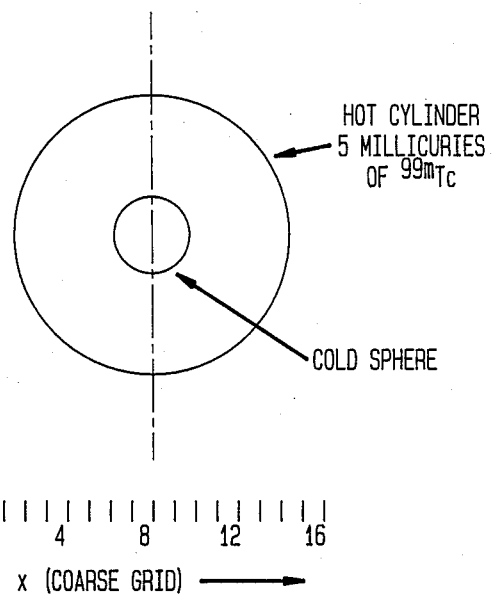
FIG. 1 is a schematic representation of a phantom used to achieve the experimental results reported herein.

FIG. 1 is a schematic representation of the phantom examined, which is a 21.5 cm cylinder containing a 6 cm diameter sphere. The phantom was provided with an adaptation so that it could be cantilevered over the top edge of the patient imaging table. In this manner, there was no attenuation or scattering resulting from the table.

Spatially dependent spectra were obtained in the following manner: A very narrow (2 keV) window was set at the lowest energy of interest, illustratively between 108 to 110 keV. An image of the object was acquired for a fixed time and stored. The window was then advanced to 110 to 112 keV and an acquisition obtained. This procedure was repeated 32 times in all. When the number of counts at any given position in the image was plotted versus energy, the desired spectra is revealed.

The following three types of data sets were obtained:

1. A cold, water-filled sphere in a surround of radioactive water. No uniformity correction was applied, but pulse-height correction was applied using EMAP, which is part of the autotune feature of the camera. That is, a camera calibration procedure takes a set of energy spectra for different locations on the camera face under flood conditions and calculates and stores a correction factor for each. After that, energy signals during image acquisition are corrected so that energy peaks occur at the same energy.

2. A hot sphere (31.5 MBq) in a cold surround. Acquisition time for each 2 keV image in this case was 20 seconds. In addition, a known activity syringe in air was similarly imaged so that quantification of the hot sphere could be performed using the syringe as a standard. No uniformity correction was applied, but an EMAP was acquired immediately before the data acquisitions.

3. A repeat of the cold sphere in the hot surround. At the same time, a syringe in air was imaged at five different locations to obtain a scatter-free spectra and check its variation with position. The syringe was placed at three different depths opposite the camera center and at a depth of 14 cm it was displaced ±5 cm off center. Uniformity correction based on a 30 million-count floor was applied and an EMAP was again obtained immediately before the data acquisition.

Analysis of Spectra

Spectra were obtained using the MDS A² computer by placing 4×4 pixel (cold sphere) or 4×16 (hot sphere) regions of interest (x by y) on successive images. The y values specifies the slice thickness, and was selected to give a relatively thin slice through the center of the cold sphere, yielding good contrast, and to provide a thick slice through the hot sphere so that its activity could be quantified. The x value of 4 specifies that the data are to be grouped to improve the statistical accuracy of points in the spectra.

The spectra were analyzed to obtain estimates of the spectra of Compton scattering events. Then, after summation, a value for the total number of Compton scatter counts at each location is obtained and used in correcting the projection image. The spectra were analyzed by a fitting method which requires knowledge of the scatter-free spectra at the given spatial location. This method, which in some embodiments of the invention involves the method of Golub, is described hereinabove.

Calculation of Projection Image

For a given slice, spectrum analysis is carried out for each of the 16 spectra having a maximum which exceeds a threshold percentage of the largest maximum for all x positions in the slice. After analysis, the Compton scatter total is obtained by summing the scatter spectrum from channel $n_1$, which is below the photopeak and typically at 117 keV, to channel $n_2$, which is above the photopeak, typically at 162 keV. This Compton scatter total is inserted into a scatter image at the appropriate x location. The values of $n_1$ and $n_2$ were selected by visual inspection. A value of zero is inserted as the scatter if the spectrum is not fit. An interpolative smoothing in x is then carried out (while maintaining counts) to obtain the 64 final scatter values.

The raw projection image of unscattered plus scattered gamma rays is formed by summing the raw data images over the same $n_1$ to $n_2$ range. Finally, a projection image corrected for Compton scattering is estimated by subtraction of the scatter from the raw image.

Attenuation Correction and Reconstruction

Since the phantom is composed of simple geometrical shapes, the average transmission through it can be calculated as a function of distance along a diameter. The calculation utilizes the linear attenuation coefficient for $^{99m}T_c$ in water, 0.151/cm. The Compton corrected projection images are then further corrected for attenuation by dividing values by the appropriate transmission.

To prepare for reconstruction, the final projection image is replicated 32 times. It should be noted that statistical inaccuracies can mimic nonuniformities in camera efficiency with this procedure, since they are not random with projection angle as they would be in actual tomographic acquisition. Reconstruction is carried out as it was for the simulated data.

Known Activity Syringe

Processing of the known activity syringe is a special case since it is assumed that Compton scattering and attenuation had negligible effects. A slice width encompassing the syringe is chosen. No correction for Compton scattering is applied, and the raw data spectra are simply summed over the same $n_1$ to $n_2$ limits used for the hot sphere to produce the projection image. This image is replicated 32 times, and no attenuation correction is applied before the reconstruction.

Scatter Fraction and Quantification

Once the spectrum at a given spatial location is separated into unscattered and Compton scattered components, the scattered fraction, SF, can be calculated. This parameter is defined as:

$$SF = (S/U)$$

where S is the total Compton scattered counts and U is the total unscattered counts. The total values are obtained from the respective spectra by summation. That is:

$$S = \sum_{i=n_1}^{n_2} c_i$$

$$U = \sum_{i=n_1}^{n_2} d_i$$

Quantification of the activity in the reconstructed hot sphere is obtained relative to the reconstructed, known activity syringe. Regions of interest for the hot sphere and for the calibrating syringe are determined in the respective slices by commercially available software, based on spatial derivatives, and, as is the case with software in the MDS $A^2$ computer, starts from a hand-drawn first estimate. The activity in the sphere, A, is then calculated from the known activity in the syringe, $A_s$, by the proportionality:

$$\frac{A}{A_s} = \frac{C}{C_s}$$

where C is the number of counts in the sphere region of interest and $C_s$ is that in the syringe region of interest. Scaling factors are also taken into consideration when evaluating the ratio of C to $C_s$.

RESULTS

Spatial Resolution

The results for the dependence of the FWHM resolution, R, on distance in front of the collimator, d, can be represented by:

$$R = 6.35 \text{ mm} + 0.0467 * d$$

Simulation

Figure 2:
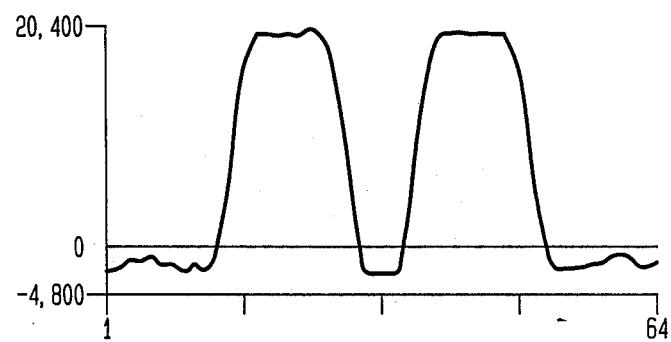
FIG. 2 is a plot of a simulated data profile through a center of a sphere, for a cold-sphere phantom reconstruction.

FIG. 2 is a plot of the simulated data profile through the center of the sphere, for the cold-sphere phantom reconstruction. Experimental data will be compared thereto.

First Cold Sphere

Figure 3:
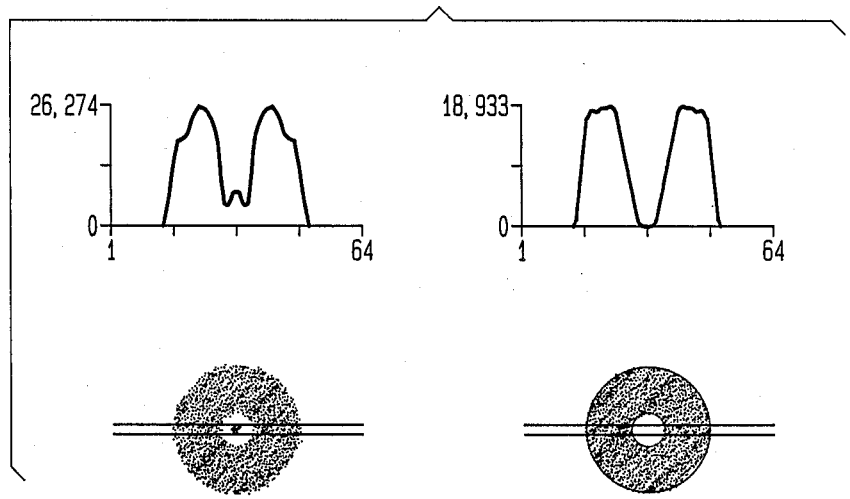
FIG. 3 is a representation of reconstructions for data which has been corrected for attenuation and Compton scattering, and for data without Compton scattering correction.

FIG. 3 is a representation of the reconstruction for the first set of cold sphere data. The image on the left has been subjected to attenuation correction, but without correction for Compton scattering, while the one on the right has been corrected for both. It is evident from this figure that the image with Compton correction is more faithful to the true object and closely resembles the ideal result given by the simulation (see FIG. 2).

Hot Sphere

Figure 4:
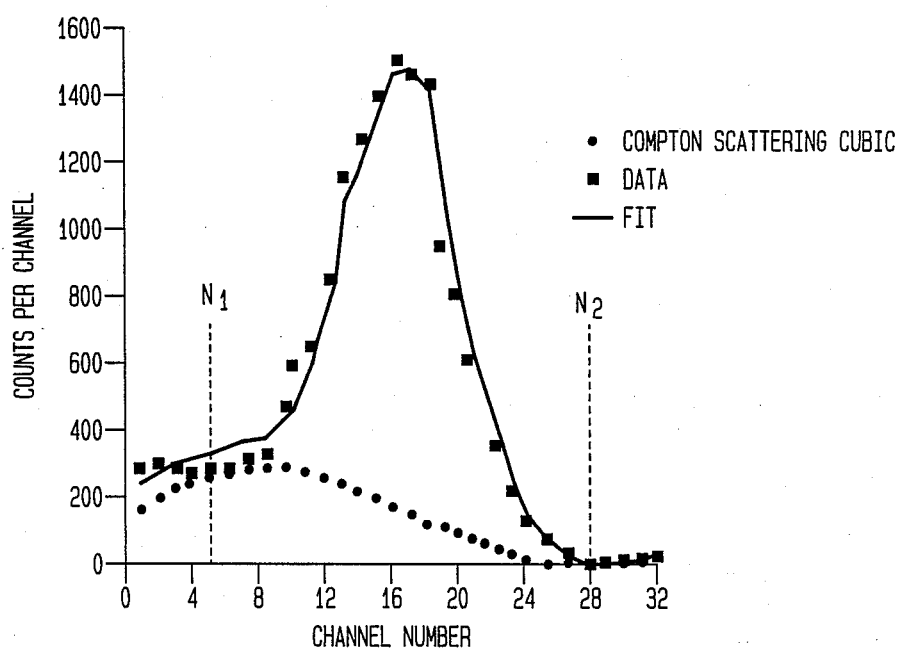
FIG. 4 is a plot of a spectrum obtained in the case of a hot sphere with cold surround, using a fitting algorithm.

FIG. 4 is a plot of a spectrum obtained in the case of the hot sphere with cold surround, using the fitting algorithm. The fitting algorithm employed a spectrum from the known activity syringe to give the $f_i$ in Eq. 2, above. The raw data for one projection of the hot sphere contained 35,269 counts so that the total counts for the thick slice are approximately 1,100,000 (32×35,269). The figure further shows the range $n_1$ to $n_2$ over which summation occurs, and the Compton scattering estimate for a cubic function. However, higher order functions can be used in the practice of the invention, and good results are achievable with fifth order functions.

The fitting method of estimating Compton scattering provided accurate quantitative results. The fitting method yielded a calculated activity in the sphere of 31.5 MBq, which is the actual true value within 0.1 MBq.

Scatter Free Spectra

Figure 5:
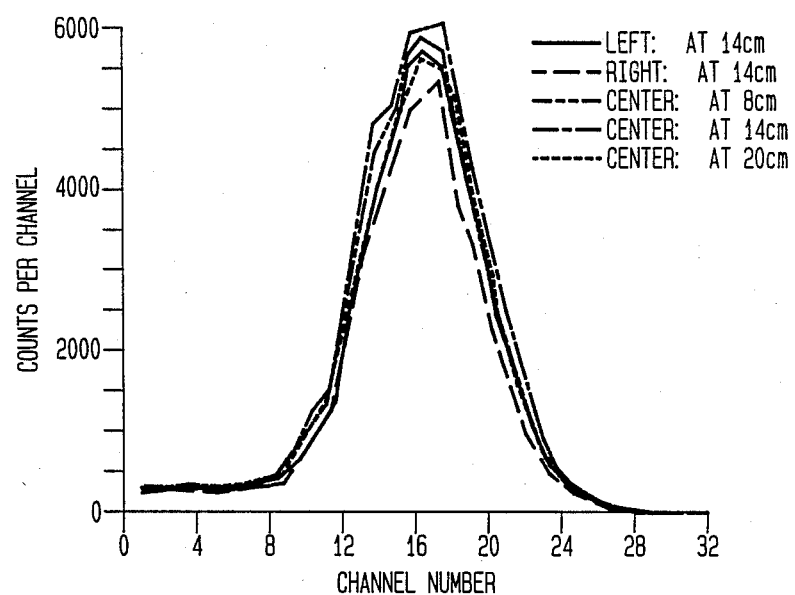
FIG. 5 illustrates various plots for the scatter free spectra for the syringe placed at different locations in front of a camera.

FIG. 5 contains various plots for the scatter free spectra for the syringe placed at different locations in front of the camera, using the fitting algorithm. The spectra are unnormalized, and differences in area are presumed to result from decay of the isotope and to any remaining nonuniformity in the camera sensitivity. It is evident from this figure that the spectra are quite congruent, and that any differences in shape are slight. Therefore, in applying the fitting algorithm to the second set of data for the cold sphere in a hot cylinder, only a single spectrum was used to represent that of the scatter-free source; specifically the one for the source opposite the center of the camera at a distance of 8 cm.

Second Cold Sphere

For the second cold sphere data set, the results of the reconstructions from the data with Compton scatter estimated by the fitting algorithm are quite good.

Scatter Fraction

The following table illustrates the scatter fraction as a function of position as computed from the fitting results for both types of phantoms. The results are presented versus location number. As shown in FIG. 1, location 8 is nearest to the center line, and location 1 is at the edge of the projection image. When no fitting of the spectrum was carried out, a double dash is inserted.

TABLE

| Scatter Fraction as a Function of Location | | | | | |
|---|---|---|---|---|---|
| Location Number* | 4 | 5 | 6 | 7 | 8 |
| Cold Sphere | 0.746 | 0.367 | 0.477 | 0.534 | 0.688 |
| Hot Sphere | — | — | — | 2.37 | 0.374 |

*8.5 = center line

It is seen from the table that the scatter fraction is large at the edge of both objects where direct events are diminishing rapidly, but scattered events remain appreciable. For the hot cylinder with a cold sphere, the scatter fraction decreases sharply just inside the edge, but then rises slowly as one progresses towards the center.

Figure 6:
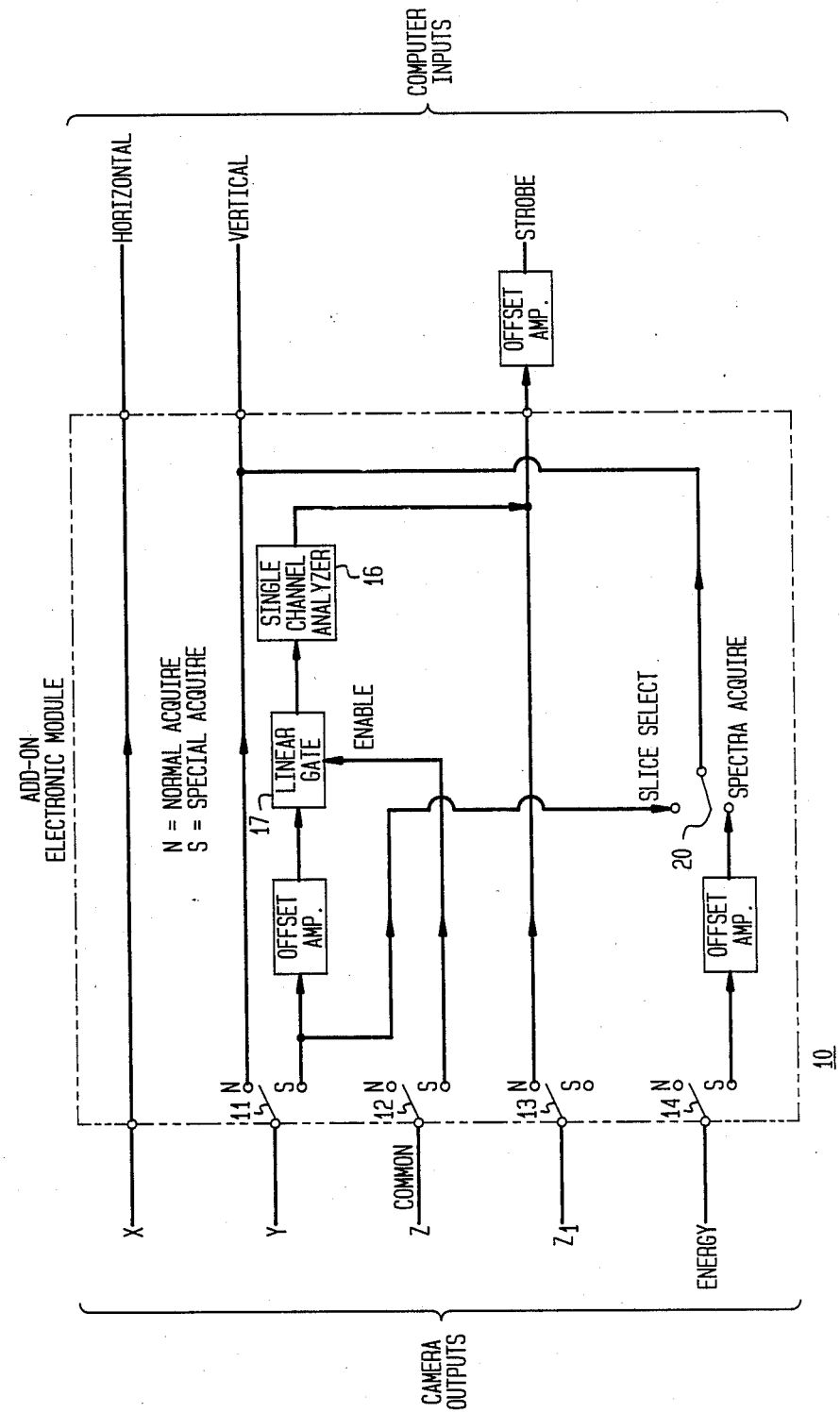
FIG. 6 is a block and line representation of an electronic add-on module useful in the practice of the invention.

FIG. 6 is a partially schematic and partially block and line representation of an electronic add-on module 10 which is useful in the practice of the invention. As shown, electronic add-on module 10 is provided with a plurality of switches, 11, 12, 13, and 14 which are connected to Y, Common Z, $Z_1$, and ENERGY inputs, respectively. These inputs are coupled to an imaging camera (not shown).

Switches 11–14 have two states. When the switches, and therefore the electronic add-on module, are in the first state, acquisition of data from the camera is performed in a normal manner. In this first state, the horizontal and vertical outputs issue data corresponding to surface image locations, illustratively on the surface of the body of a patient. These signals are conducted to a analog-to-digital input of a computer (not shown) where a memory is installed and addressed in response to these signals. Therefore the electronic add-on module is essentially transparent to the overall system in this mode, and memory enablement is received essentially from the $Z_1$ input.

When switches 11–14 and electronic add-on module 10 are in the second state, a single channel analyzer 16 is rendered operable by a linear gate 17 which, when enabled, permits propagation therethrough of analog signals obtained from the Y input. This gate is operated in response to the signal at the Common Z input, and therefore the linear gate can be operated to eliminate noise. The single channel analyzer then provides its output, during periods that the Y input value is within a specified range, at the STROBE output of electronic add-on module 10. This STROBE output signal is typically a digital signal which enables the memory (not shown) in the computer to capture the energy signal, which is produced at the VERTICAL output. Also during the operation of electronic add-on module 10 in the second mode, a switch 20 selects whether the VERTICAL output supplies to the computer the image position information from the Y input, or spectral information from the ENERGY input. The signal at the ENERGY input corresponds to the energy content of the detected photons.

Although the invention has been described in terms of specific embodiments and applications, persons skilled in the art can, in light of this teaching, generate additional embodiments without exceeding the scope or departing from the spirit of the claimed invention. Accordingly, it is to be understood that the drawing and descriptions in this disclosure are proffered to facilitate comprehension of the invention, and should not be construed to limit the scope thereof.

What is claimed is:

1. A method of reducing the effects of Compton scattered photons detected in a gamma ray detection arrangement, the method comprising the steps of:
   receiving data responsive to energy states of the detected photons and storing said data in memory locations corresponding to predetermined image grid points;
   calibrating the gamma ray detection arrangement by acquiring a spectral shape corresponding to a calibration function which is expected to correspond to a first data set corresponding to unscattered ones of the detected photons;
   processing said stored data for at least selected ones of said predetermined grid points for separating said stored data into said first data set corresponding to unscattered ones of the detected photons and a second data set corresponding to scattered ones of the detected photons;
   summing said first data set for each of said selected ones of said predetermined grid points for determining a number of said unscattered ones of said detected photons; and
   forming an image utilizing said number of said unscattered ones of said detected photons.

2. The method of claim 1 wherein said step of processing comprises the further step of performing a least squares fit between said stored data and a function which includes at least a portion of said calibration function.

3. The method of claim 2 wherein said calibration function is multiplied by a parameter and added to a polynomial with other parameters prior to said step of performing a least squares fit to obtain values for the parameters.

4. The method of claim 2 wherein said step of performing a least squares fit includes the further step of matrix decomposition.

5. The method of claim 1 wherein said selected ones of said predetermined number of points correspond to a coarse imaging grid of said image.

6. The method of claim 5 wherein there is provided the further step of interpolating between said selected ones of said predetermined number of points corresponding to said coarse grid to produce a greater number of points, said greater number of points corresponding to a fine imaging grid.

7. The method of claim 6 wherein said greater number of points corresponds to said predetermined number of points.

8. A method of reducing the effects of Compton scattered photons detected in a gamma ray detection arrangement, the method comprising the steps of:

receiving data responsive to energy states of the detected photons and storing said data in memory locations corresponding to a predetermined number of image grid points;

grouping said stored data, whereby a coarser grid having fewer image grid points than said predetermined number is produced;

producing a calibration function which is expected to correspond to a first data set corresponding to unscattered ones of the detected photons;

processing said data corresponding to said image grid points on said coarser grid for separating said stored data into said first data set corresponding to unscattered ones of the detected photons and a second data set corresponding to scattered ones of the detected photons;

summing said first data set for each of said predetermined grid points on said coarser grid for determining a number of said unscattered ones of said detected photons;

interpolating from said first data set for each of said predetermined grid points on said coarser grid for producing a data set corresponding to said unscattered ones of the detected photons for each of said predetermined number of grid points; and forming an image utilizing said number of said unscattered ones of said detected photons.

9. The method of claim 8 wherein said step of processing comprises the further step of performing a least squares analysis.

10. A method of reducing the effects of Compton scattered photons detected in a gamma ray detection arrangement, the method comprising the steps of:

receiving data responsive to energy states of detected photons and storing said data in memory locations corresponding to a predetermined number of image grid points;

summing said stored data for each of said predetermined number of image grid points for determining a total number of said detected photons;

grouping said stored data, whereby a coarser grid having fewer image grid points is produced;

processing said data corresponding to said image grid points on said coarser grid for separating said stored data into a first data set corresponding to unscattered ones of said detected photons and a second data set corresponding to scattered ones of said detected photons;

summing said second data set for each of said predetermined grid points on said coarser grid for determining a number of said scattered ones of said detected photons;

interpolating from said second data set for each of said predetermined grid points on said coarser grid for producing a data set corresponding to said scattered ones of said detected photons for each of said predetermined number of grid points;

subtracting said data set corresponding to said scattered ones of said detected photons for each of said predetermined number of grid points from said total number of said detected photons, to produce at each of said predetermined number of grid points a data set corresponding to unscattered ones of said detected photons; and forming an image utilizing said number of said unscattered ones of said detected photons.

11. The method of claim 10 wherein prior to performing said step of processing there is provided the further step of calibrating the gamma ray detection arrangement by acquiring a spectral shape corresponding to a calibration function which is expected top correspond to said first data set.

12. The method of claim 11 wherein said step of processing comprises the further step of performing a least squares fit between said stored data and a function which includes at least a portion of said calibration function.

13. The method of claim 11 wherein said step of performing a least squares fit includes the further step of matrix decomposition.

* * * * *

UNITED STATES PATENT AND TRADEMARK OFFICE
CERTIFICATE OF CORRECTION

PATENT NO. : 4,839,808

DATED : June 13, 1989

INVENTOR(S) : Kenneth F. Koral, W. Leslie Rogers, and Neal H. Clinthorne

It is certified that error appears in the above-identified patent and that said Letters Patent is hereby corrected as shown below:

Column 4, line 56, after "experimental" insert -- spectrum --;

Column 5, line 34, change " B " to -- $\underline{B}$ --;
Column 5, line 35, change " B " to -- $\underline{\underline{B}}$ --;
Column 8, line 56, change " floor " to -- flood --;

Signed and Sealed this

Twenty-ninth Day of May, 1990

Attest:

HARRY F. MANBECK, JR.

Attesting Officer  Commissioner of Patents and Trademarks

UNITED STATES PATENT AND TRADEMARK OFFICE
CERTIFICATE OF CORRECTION

PATENT NO. : 4,839,808
DATED : June 13, 1989
INVENTOR(S) : Koral, Kenneth et al.

It is certified that error appears in the above-indentified patent and that said Letters Patent is hereby corrected as shown below:

Column 1, between the title and the heading "Background of the Invention", please insert the following paragraph:

-- Government Rights

This invention was made with Government support under Grant No. 2R01 CA32846 awarded by the National Cancer Institute of the National Institutes of Health. The Government has certain rights in the invention --.

Column 10, line 67, change "n1" to -- $n_1$ --;
Column 10, line 68, change "n2" to -- $n_2$ --.

Signed and Sealed this

Twentieth Day of August, 1996

Attest:

BRUCE LEHMAN

Attesting Officer

Commissioner of Patents and Trademarks